US012763060B2

(12) United States Patent
Belyi et al.

(10) Patent No.: US 12,763,060 B2
(45) Date of Patent: Oct. 13, 2026

(54) FEED FORWARD ACTIVE NOISE CANCELLATION SYSTEM

(71) Applicant: GN Audio A/S, Ballerup (DK)

(72) Inventors: Valiantsin Belyi, Ballerup (DK); Yurii Iotov, Ballerup (DK); Sidsel Marie Nørholm, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 121 days.

(21) Appl. No.: 18/830,119

(22) Filed: Sep. 10, 2024

(65) Prior Publication Data

US 2025/0104684 A1 Mar. 27, 2025

(30) Foreign Application Priority Data

Sep. 22, 2023 (EP) .................................... 23199124

(51) Int. Cl.
*G10K 11/178* (2006.01)
*H04R 1/10* (2026.01)

(52) U.S. Cl.
CPC .. *G10K 11/17815* (2018.01); *G10K 11/17854* (2018.01); *H04R 1/1083* (2013.01); *H04R 2460/01* (2013.01)

(58) Field of Classification Search
CPC ........ G10K 11/17815; G10K 11/17854; H04R 1/1083; H04R 2460/01
USPC ........................................................ 381/71.6
See application file for complete search history.

(56) References Cited

U.S. PATENT DOCUMENTS

| | | | | |
|---|---|---|---|---|
| 8,280,065 B2 * | 10/2012 | Nadjar | G10K 11/17825 381/71.8 |
| 2014/0126733 A1 * | 5/2014 | Gauger, Jr. | G10K 11/1783 381/71.6 |
| 2015/0104031 A1 * | 4/2015 | Park | G10K 11/17854 381/71.6 |
| 2016/0093281 A1 * | 3/2016 | Kuo | G10K 11/17885 381/71.1 |

OTHER PUBLICATIONS

The extended European search report issued in European Application No. 23199124.1, dated Apr. 26, 2024.
Iotov et al., "Adaptive Sparse Linear Prediction in Fixed-Filter ANC Headphone Applications for Multi-Speaker Speech Reduction," 2023 IEEE Workshop on Applications of Signal Processing to Audio and Acoustics (WASPAA), New Paltz, NY, USA, 2023, pp. 1-5.
Benesty et al., "An improved PNLMS algorithm," 2002 IEEE International Conference on Acoustics, Speech, and Signal Processing, Orlando, FL, USA, 2002, pp. II-1881-II-1884.
Giacobello et al., "Joint estimation of short-term and long-term predictors in speech coders," 2009 IEEE International Conference on Acoustics, Speech and Signal Processing, Taipei, Taiwan, 2009, pp. 4109-4112.

* cited by examiner

*Primary Examiner* — Sean H Nguyen
(74) *Attorney, Agent, or Firm* — HSML P.C.

(57) ABSTRACT

A feedforward active noise cancellation system comprising one or more reference microphones, one or more loudspeakers, one or more error microphones, a first filter, and a second and adaptive filter. The first filter is configured to filter a first input signal to minimize a residual error. The second and adaptive filter comprises a linear predictor of speech. The second and adaptive filter is configured to filter a second input signal based on predicted speech to compensate for a processing delay and a second propagation delay exceeding a first propagation delay.

9 Claims, 1 Drawing Sheet

FEED FORWARD ACTIVE NOISE CANCELLATION SYSTEM

The present disclosure relates to a feedforward active noise cancellation system, an audio device comprising such a system, and a method for feedforward active noise cancellation.

BACKGROUND

Active noise cancellation, ANC, technology spans a wide variety of applications, and is used within a wide variety of audio devices. ANC is becoming more prominent and widespread in consumer electronics, e.g., headphones, headsets, and wireless earbuds. A use case for ANC is in crowded public spaces or open offices, where speech and noise may pose an annoyance, thus, reducing concentration and productivity. Hence, it is increasingly important that ANC headphones attenuates human voices and noise effectively. However, speech attenuation by ANC headphones can be quite limited due to the complex nature of speech, i.e., being highly non-stationary.

ANC is based on the principle of acoustic superposition, such that an anti-noise signal with the same amplitude and opposite phase is generated by a secondary source (e.g., headphone loudspeaker) to cancel unwanted noise at the desired cancellation point, e.g., at the eardrum. To generate an anti-noise signal in adaptive ANC systems, adaptive algorithms such as Filtered-X least mean square, FXLMS, or Filtered-X Normalized LMS, FXNLMS, are commonly used. Modern ANC headphones are typically based on either fixed feedforward, FF, or feedback, FB, ANC filter or a combination of both. Many factors affect ANC performance in headphones, and one of those factors is the causality constraint.

The causality constraint is violated in FF ANC systems, when the signal propagation delay between the reference and the error microphone is less than the electric delay and acoustic propagation delay between the loudspeaker and the error microphone. The causality constraint might be violated due to the small size of the headphones or long latency times in the processing. The amount of electric delay may depend on the ANC processing unit and its algorithmic design. When the causality constraint is violated, it creates the need for prediction to compensate for the delay. In adaptive ANC systems, the adaptive algorithm acts as a predictor to find a causal filter. For a fixed filter ANC system, the occurrence of the delay D cannot be compensated for in the fixed-filter design stage, and, thereby, the performance of this ANC system will be significantly reduced.

SUMMARY

Accordingly, there is a need for an improved feedforward active noise cancellation system.

According to a first aspect of the present disclosure there is provided a feedforward active noise cancellation system. The system comprising one or more reference microphones for obtaining an input audio signal indicative of a first ambient sound. The system comprising one or more loudspeakers for outputting a first anti-noise sound. The system comprising one or more error microphones for obtaining an error signal indicative of a second anti-noise sound and a second ambient sound. The second ambient sound corresponds to the first ambient sound having travelled a first sound path having a first propagation delay from the one or more reference microphones to the one or more error microphones. The second anti-noise sound corresponds to the first anti-noise sound having travelled along a second sound path having a second propagation delay from the one or more loudspeakers to the one or more error microphones. The system comprises a first filter configured to receive a first input signal, filter the first input signal, and output a first filtered audio signal. The first filter is configured to filter the first input signal to minimize a residual error determined based on the input audio signal and the error signal. A second and adaptive filter configured to receive a second input signal, filter the second input signal, and output a second filtered audio signal. The second and adaptive filter comprises a linear predictor of speech. The second and adaptive filter is configured to filter the second input signal based on predicted speech to compensate for a processing delay and the second propagation delay exceeding the first propagation delay.

Consequently, there is provided a system which may overcome the problem of the causality constraint and handle the complex non-stationary nature of speech.

By a feedforward active noise cancellation, ANC, system is to be understood any system where one or more microphones are arranged to obtain ambient sounds, and feed them forward to a processing circuit configured to generate an anti-noise signal based on the obtained ambient sounds. The anti-noise signal may then be fed to a loudspeaker which may output an anti-noise sound based on the anti-noise signal.

The one or more reference microphones are for obtaining an input audio signal indicative of a first ambient sound The one or more reference microphones may be microphones arranged to obtain ambient sounds. The one or more reference microphones may be arranged to be facing an environment generating sounds desired to be cancelled, e.g., for a headset or an earbud the one or more reference microphones may be arranged on an outer shell of the headset or earbud facing away from the user.

In the present disclosure, the first ambient sound may be understood as ambient sound originating from a surrounding environment of the one or more reference microphones.

The one or more loudspeakers may be any type of output transducers capable of outputting an anti-noise sound.

An anti-noise sound may be understood as sound with the substantially same amplitude, but a substantially opposite phase of noise desired to be cancelled out.

The one or more error microphones may be microphones arranged coinciding or near the cancellation point, i.e., the point where anti-noise should cancel out noise. The one or more error microphones are configured to obtain an error signal indicative of the anti-noise sound and second ambient sounds. The error signal may give an estimate on the performance of the ANC system, i.e., how well was the incoming noise cancelled.

The first sound path may in the present disclosure be understood as a path sound travels between the one or more reference microphones and the one or more error microphones. Associated with the first sound path is a first propagation delay, corresponding to the time required for sound to travel the first sound path.

The second sound path may in the present disclosure be understood as a path sound travels between the one or more loudspeakers and the one or more error microphones. Associated with the second sound path is a second propagation delay, corresponding to the time required for sound to travel the second sound path. A processing delay is also associated with the second sound path, due to ambient sound being processed before being outputted as anti-noise.

The first filter may be an adaptive or a fixed filter. The first filter may be a time domain or a frequency domain filter. The first filter is configured to filter a first input signal based on a primary transfer function and a secondary transfer function. The first filter is configured to output a first filtered audio signal. The first filter may be an LMS filter or a Wiener filter. The first filter is configured to minimize a residual error determined based on the input audio signal and the error signal. The first filter may be an adaptive filter with fixed filter coefficients, e.g., the filter coefficients may have been determined in a factory setting or similar and subsequently fixed.

The first input signal may be based on the input audio signal. In some embodiments the first input signal may correspond to the input audio signal. In some embodiments, the first input signal may be the input audio signal having undergone preliminary processing before being fed to the first filter. In some embodiments, the first input signal may be based on a second filtered audio signal.

The first filtered audio signal may in some embodiments be viewed as the result of an optimal transfer function for feed forward noise cancellation in the case of the first sound path and the second path being time aligned. In other words, the first filter may be described as the causal filter. A more in-depth explanation may be found in S. M. Kuo and D. R. Morgan, "Active noise control: a tutorial review," Proc. IEEE, vol. 87, no. 6, pp. 943-973, 1999. A more in-depth explanation will be provided in relation to the figures.

The second input signal may be based on the first filtered audio signal. In some embodiments the second input signal may correspond to the first filtered audio signal. In some embodiments, second input signal may be the first filtered audio signal having undergone preliminary processing before being fed to the second filter. In some embodiments, the second input signal may be based on the first filtered audio signal.

The second filtered audio signal may in some embodiments be viewed as the first filtered audio signal compensated for the non-causality caused by the first sound path and the second path not being time aligned, e.g., due to the second propagation delay together with a processing delay exceeding the first propagation delay.

In an embodiment, the first filter is configured to filter the first input signal based on a primary transfer function and a secondary transfer function, wherein the primary transfer function is determined based on estimated characteristics of the first sound path, and wherein the secondary transfer function is determined based on estimated characteristics of the second sound path.

The primary transfer function substantially describes how sound travelling the first sound path is transformed.

The secondary transfer function substantially describes how sound travelling the second sound path is transformed.

The estimated characteristics of the first sound path and the second path may be measured in a controlled setting, e.g., sound engineers at a production site may measure the characteristics. The estimated characteristics of the first sound path and the second path may be measured during use of the feedforward active noise cancellation system, e.g., by comparing the first ambient sound to the second ambient sound and comparing the first anti-noise sound to the second anti-noise sound.

The second filter may be a time domain or a frequency domain filter. The second filter is configured to filter a second input signal based on predicted speech to compensate for a processing delay and the second propagation delay exceeding the first propagation delay.

The second filter is adapted/updated to minimize the residual error. The residual error is determined based on the obtained input audio signal and the obtained error signal.

In the present disclosure, the processing delay may be understood as the delay caused by the processing of the first ambient sound to create a corresponding anti-noise signal to be outputted by the one or more loudspeakers. The processing delay may be caused be a wide variety of processes, such as analog to digital conversion, digital to analog conversion, or processing of the audio signal stemming from the first ambient sound.

In an embodiment the first filter is configured to filter the first input signal based on a minimum phase part of primary transfer function, and a minimum phase part of the secondary transfer function.

In an embodiment the linear predictor of speech comprises a high-order sparse linear predictor.

Consequently, a computationally efficient predictor is provided for predicting speech. A more in-depth presentation of the high-order sparse linear predictor may be found in D. Giacobello, M. G. Christensen, M. Murthi, S. H. Jensen, and M. Moonen, "Joint estimation of short-term and longterm predictors in speech coders," in Proc. IEEE Int. Conf. Acoust., Speech, Signal Processing, 2009, pp. 4109-4112.

In an embodiment the second and adaptive filter is adapted based on an improved proportionate normalised least mean squares algorithm.

Consequently, a computationally efficient algorithm is provided for adapting the second and adaptive filter. The improved proportionate normalised least mean squares, IPNLMS, algorithm have been proven to especially advantageous with sparse systems, consequently, it may be especially advantageous to use the IPNLMS algorithm in conjunction with the high-order sparse linear predictor. A more in-depth presentation of the IPNLMS algorithm may be found in J. Benesty and S. L. Gay, "An improved PNLMS algorithm," in Proc. IEEE Int. Conf. Acoust., Speech, Signal Processing, 2002, vol. 2, pp. 1881-1884.

In an embodiment the first filter is a fixed filter.

Consequently, a simple and computationally efficient solution is provided, where only the second and adaptive filter needs to be updated.

In the present disclosure, a fixed filter is to be understood as a filter where the filter coefficients are kept constant during inference.

According to a second aspect of the present disclosure, there is disclosed an audio device comprising a feedforward active noise cancellation system according to the first aspect of the present disclosure.

The audio device may be configured to be worn by a user. The audio device may be arranged at the user's ear, on the user's ear, over the user's ear, in the user's ear, in the user's ear canal, behind the user's ear, and/or in the user's concha, i.e., the audio device is configured to be worn at the user's ear.

The audio device may be configured to be worn by a user at each ear, e.g., a pair of ear buds or a head set with two earcups. In the embodiment where the audio device is to be worn at both ears, the components meant to be worn at each ear may be connected, such as wirelessly connected and/or connected by wires, and/or by a strap. The components meant to be worn at each ear may be substantially identical or differ from each other.

The audio device may be a hearable such as a headset, headphones, earphones, ear bud, hearing aids, an over the counter (OTC) hearing device, a hearing protection device, a one-size-fits-all audio device, a custom audio device or another head-wearable audio device.

The audio device may be embodied in various housing styles or form factors. Some of these form factors are earbuds, on the ear headphones, or over the ear headphones. The person skilled in the art is aware of various kinds of audio device and of different options for arranging the audio device in and/or at the ear of the audio device wearer.

The audio device may comprise an interface. The interface may comprise a wireless transceiver, also denoted as a radio transceiver, and an antenna for wireless transmission and reception of an audio signal, such as for wireless transmission of an output signal and/or wireless reception of a wireless input signal. The audio device may be configured for wireless communication with one or more electronic devices, such as another audio device, a smartphone, a tablet, a computer and/or a smart watch. The audio device optionally comprises an antenna for converting one or more wireless input audio signals to antenna output signal(s). The audio device may be configured for wireless communications via a wireless communication system, such as short-range wireless communications systems, such as Wi-Fi, Bluetooth, Zigbee, IEEE 802.11, IEEE 802.15, infrared and/or the like. The audio device may be configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimetre-wave communications in licensed bands. In one or more example audio devices the interface of the audio device comprises one or more of: a Bluetooth interface, Bluetooth low energy interface, and a magnetic induction interface. For example, the interface of the audio device may comprise a Bluetooth antenna and/or a magnetic interference antenna. In one or more example audio devices, the interface may comprise a connector for wired communication, via a connector, such as by using an electrical cable. The connector may connect one or more microphones to the audio device. The connector may connect the audio device to an electronic device, e.g., for wired connection. The one or more interfaces can be or comprise wireless interfaces, such as transmitters and/or receivers, and/or wired interfaces, such as connectors for physical coupling.

The audio device may comprise a plurality of input transducers. The plurality of input transducers may comprise a plurality of microphones. The plurality of input transducers may be configured for converting an acoustic signal into an electric input signal. The electric input signal may be an analog signal. The electric input signal may be a digital signal. The plurality of input transducers may be coupled to one or more analog-to-digital converters configured for converting the analog input signal into a digital input signal.

The audio device may comprise one or more antennas configured for wireless communication. The one or more antennas may comprise an electric antenna. The electric antenna is configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antennas may comprise a magnetic antenna. The magnetic antenna may comprise a magnetic core. The magnetic antenna comprises a coil. The coil may be coiled around the magnetic core. The magnetic antenna is configured for wireless communication at a second frequency. The second frequency may be below 100 MHz. The second frequency may be between 9 MHz and 15 MHz.

The audio device may comprise one or more processing units. The processing unit may be configured for processing one or more input signals. The processing may comprise compensating for a hearing loss of the user, i.e., apply frequency dependent gain to input signals in accordance with the user's frequency dependent hearing impairment. The processing may comprise performing feedback cancellation, beamforming, tinnitus reduction/masking, noise reduction, noise cancellation, speech recognition, bass adjustment, treble adjustment, face balancing and/or processing of user input. The processing unit may be a processor, an integrated circuit, an application, functional module, etc. The processing unit may be implemented in a signal-processing chip or a printed circuit board (PCB). The processing unit is configured to provide an electric output signal based on the processing of one or more input signals. The processing unit may be configured to provide one or more further electric output signals. The one or more further electric output signals may be based on the processing of one or more input signals. The processing unit may comprise a receiver, a transmitter and/or a transceiver for receiving and transmitting wireless signals. The processing unit may control one or more playback features of the audio device.

The audio device may comprise an output transducer. The output transducer may be coupled to the processing unit. The output transducer may be a loudspeaker, or any other device configured for converting an electrical signal into an acoustical signal. The receiver may be configured for converting an electric output signal into an acoustic output signal.

The audio device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The audio device may comprise a memory, including volatile and non-volatile forms of memory.

In an embodiment, the audio device comprises a headset or a set of earbuds.

According to a third aspect of the present disclosure there is provided a method for feedforward active noise cancellation comprising:

obtaining an input audio signal indicative of ambient sounds, filtering a first input signal to provide a first filtered audio signal, wherein the first input signal is based on the input audio signal, wherein the filtering is based on a primary transfer and a secondary transfer function, wherein the primary transfer function is determined based on estimated characteristics of a first sound path a first propagation delay from one or more reference microphones to one or more error microphones, and wherein the secondary transfer function is determined based on estimated characteristics of a second sound path having a second propagation delay from one or more loudspeakers to the one or more error microphones, filtering a second input signal to provide a second filtered audio signal, wherein the second input signal is based on the first filtered audio signal, wherein filtering the second input signal comprises to predict speech to compensate for a processing delay and the second propagation delay exceeding the first propagation delay, wherein speech is predicted by a linear predictor of speech.

BRIEF DESCRIPTION OF THE DRAWINGS

The above and other features and advantages of the present invention will become readily apparent to those skilled in the art by the following detailed description of example embodiments thereof with reference to the attached drawings, in which.

DETAILED DESCRIPTION

Figure 1:
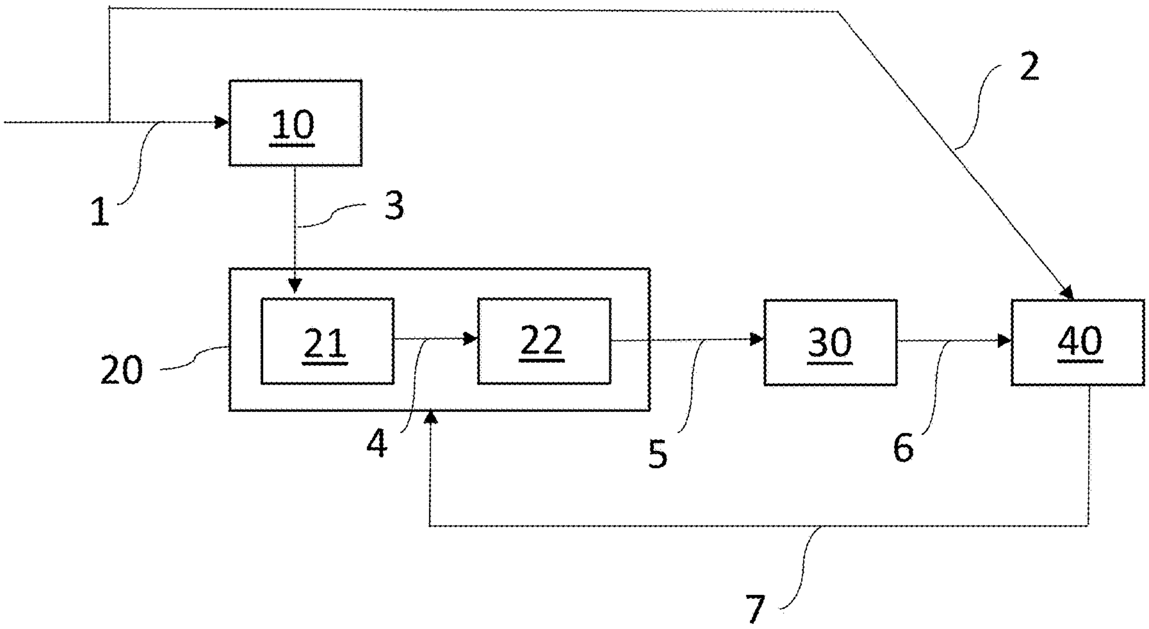
FIG. 1 is a schematic drawing of a feedforward active noise cancellation system according to the present disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Referring initially to FIG. 1 which depicts a schematic drawing of a feedforward active noise cancellation system according to the present disclosure. The system comprises one or more reference microphones 10. The one or more reference microphones 10 are for obtaining an input audio signal 3 indicative of a first ambient sound 1. The first ambient sound 1 may speech or other noise desired to be cancelled by the system. The input audio signal is sent to a processing unit 20.

The system comprises the processing unit 20. The processing unit 20 may perform any number of processing steps on the input audio signal 3. The input audio signal 3 or a processed version of the input audio signal is sent to a first filter 21 in the processing unit 20. The signal 3 sent to the first filter 21 will now be referred to as the first input signal 3.

The system comprises the first filter 21. The first filter 21 is configured to receive the first input signal 3, filter the first input signal 3, and output a first filtered audio signal 4. Filtering of the first input signal 3 may comprise a any number steps. Filtering of the first input signal 3 may comprise changing or otherwise modulating the first input signal 3. The first filter 21 is configured to filter the first input signal 3 based on a primary transfer function and a secondary transfer function. The primary transfer function is determined based on estimated characteristics of a first sound path. The secondary transfer function is determined based on estimated characteristics of a second sound path. The first sound path corresponds to a sound path where sound has travelled from the one or more reference microphones 10 to one or more error microphones 40. The second sound path corresponds to a sound path where sound has travelled from one or more loudspeakers 30 to the one or more error microphones 40. The first sound path has a first propagation delay associated with it. The first propagation delay being indicative of the time taken for sound to travel from the one or more reference microphones 10 to the one or more error microphones 40. The second sound path has a second propagation delay associated with it. The second propagation delay being indicative of the time taken for sound to travel from the one or more loudspeakers 30 to the one or more error microphones 40. The first filter 21 may be configured to filter the first input signal 3 based on a minimum phase part of primary transfer function, and a minimum phase part of the secondary transfer function. The first filter 21 may be a fixed filter. The first filtered audio signal 4 may undergo further processing before being sent to a second and adaptive filter 22 or be sent to the second and adaptive filter 22. The signal 4 sent to the second and adaptive filter 22 will now be referred to as a second input signal 4.

The system comprises the second and adaptive filter 22. The second and adaptive filter 22 is configured to receive the second input signal 4, filter the second input signal 4, and output a second filtered audio signal 5. The second and adaptive 22 filter comprises a linear predictor of speech. The second and adaptive filter 22 is configured to filter the second input signal 4 based on predicted speech to compensate for a processing delay and the second propagation delay exceeding the first propagation delay. The linear predictor of speech may comprise a high-order sparse linear predictor. The second and adaptive filter 22 may be adapted based on an improved proportionate normalised least mean squares algorithm. The second filtered audio signal 5 may undergo further processing before being sent to the one or more loudspeakers 30 or be sent to the one or more loudspeakers. The signal 5 sent to the one or more loudspeakers will now be referred to as a first anti-noise signal 5.

The system comprises one or more loudspeakers 30 for outputting a first anti-noise sound 6. The first anti-noise sound 6 is based on the first anti-noise signal 5. The first anti-noise signal 5 is based on the second filtered audio signal 5.

The system comprises one or more error microphones 40 for obtaining an error signal 7 indicative of a second anti-noise sound and a second ambient sound 2. The second ambient sound corresponds to the first ambient sound having travelled the first sound path from the one or more reference microphones 10 to the one or more error microphones 40. The second anti-noise sound corresponds to the first anti-noise sound 6 having travelled along a second sound path from the one or more loudspeakers 30 to the one or more error microphones 40. The error signal 7 may be used for determining a residual error. The second adaptive filter 21 may be adapted to minimize the residual error determined.

Figure 2:
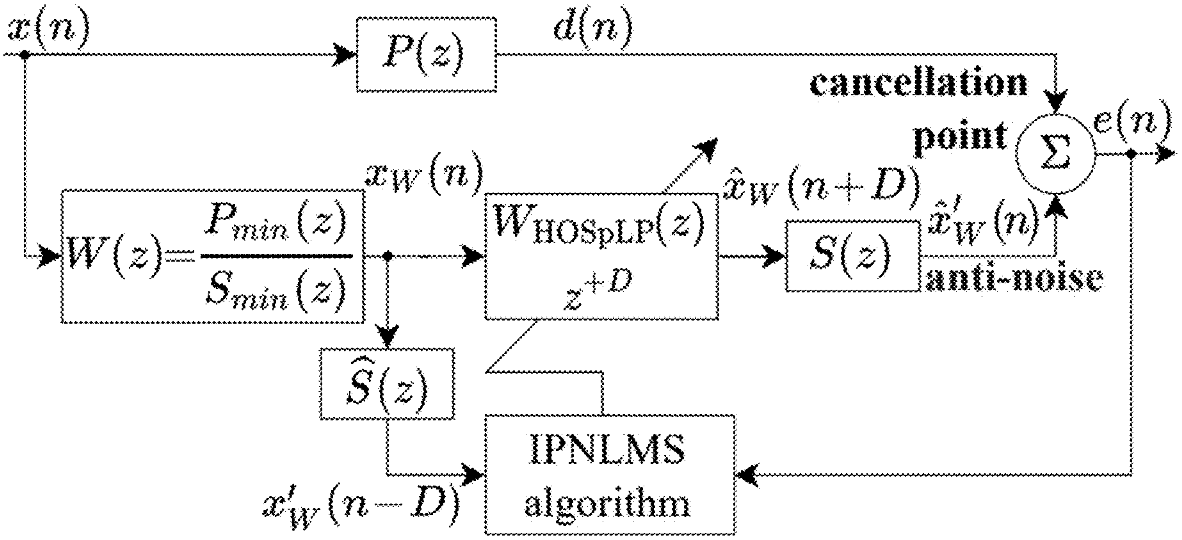
FIG. 2 is a schematic drawing of a signal flow diagram of a feedforward active noise cancellation system according to the present disclosure.

Referring to FIG. 2 depicting a schematic drawing of a signal flow diagram of a feedforward active noise cancellation system according to the present disclosure. The incoming noise x(n) propagates through two paths, one denoted as the first sound path running between the one or more reference microphones 10 and the one or more error microphones 40 and having a first propagation delay, the other being denoted as the second first sound path running between the one or more loudspeakers 30 and the one or more error microphones 40 and having a second propagation delay. However, before being outputted by the one or more loudspeakers processing takes place introducing a processing delay, which is then associated with the second sound path. Sound traveling via the first sound path may be described as being transformed according to the primary transfer function denoted P(z). Sound traveling via the second sound path may be described as being transformed according to the secondary transfer function denoted S(z). The optimal transfer function $W_0(z)$ for a feedforward active noise cancellation filter is $$W_0(z) = \frac{P(z)}{S(z)}$$

However, since P(z) and S(z) include sound paths and S(z) also has the processing delay associated with it, they are non-minimum phase and can be expressed as $$P(z) = P_{min}(z)z^{-D_1} \text{ and } S(z) = S_{min}(z)z^{-(D_2+D_3)}$$

where (•)min denotes the minimum-phase part, $D_1$ is the first propagation delay, $D_2$ is the second propagation delay, and $D_3$ is the processing delay. Hence, a causal $W_0(z)$ can only be realized if P(z) contain a delay of at least equal length as S(z). The additional delay D associated with S(z) may be expressed as $$D = D_3 + D_2 - D_1$$

The additional delay in S(z) will require the optimal filter to be non-causal, which creates a need for prediction. In the presented example a high order sparse linear predictor, HOSpLP, is used for the prediction. The first filter 21, $W_{(z)}$, may then be determined as a causal fixed filter by taking the minimum-phase part of P(z) and S(z), i.e., $$W(z) = \frac{P_{min}(z)}{S_{min}(z)}$$

The delay Dis then compensated for by the second filter 22, $W_{HOSpLP}$, utilizing the HOSpLP which predicts $x_w(n)$ D samples ahead in time, resulting in d(n) and $$x'_w(n)$$

being aligned in time at the cancellation point.

The second filter 22 in the presented example is updated based on an IPNLMS algorithm, based on the signal obtained by the one or more reference microphones 10, and the one or more error microphones 40.

Examples of audio devices and related methods according to the disclosure is set out in the following items:

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

Items

1. A feedforward active noise cancellation system comprising:
   - one or more reference microphones for obtaining an input audio signal indicative of a first ambient sound,
   - one or more loudspeakers for outputting a first anti-noise sound,
   - one or more error microphones for obtaining an error signal indicative of a second anti-noise sound and a second ambient sound, wherein the second ambient sound corresponds to the first ambient sound having travelled a first sound path having a first propagation delay from the one or more reference microphones to the one or more error microphones, and wherein the second anti-noise sound corresponds to the first anti-noise sound having travelled along a second sound path having a second propagation delay from the one or more loudspeakers to the one or more error microphones, a first filter configured to receive a first input signal, filter the first input signal, and output a first filtered audio signal, wherein the first filter is configured to filter the first input signal to minimize a residual error determined based on the input audio signal and the error signal, a second and adaptive filter configured to receive a second input signal, filter the second input signal, and output a second filtered audio signal, wherein the second and adaptive filter comprises a linear predictor of speech, wherein the second and adaptive filter is configured to filter the second input signal based on predicted speech to compensate for a processing delay and the second propagation delay exceeding the first propagation delay.

2. A feedforward active noise cancellation system according to item 1, wherein the first filter is configured to filter the first input signal based on a primary transfer function and a secondary transfer function, wherein the primary transfer function is determined based on estimated characteristics of the first sound path, and wherein the secondary transfer function is determined based on estimated characteristics of the second sound path.

3. A feedforward active noise cancellation system according to item 2, wherein the first filter is configured to filter the first input signal based on a minimum phase part of the primary transfer function, and a minimum phase part of the secondary transfer function.

4. A feedforward active noise cancellation system according to any of the preceding items, wherein the linear predictor of speech comprises a high-order sparse linear predictor.

5. A feedforward active noise cancellation system according to any of the preceding items, wherein the second and adaptive filter is adapted based on an improved proportionate normalised least mean squares algorithm.

6. A feedforward active noise cancellation system according to any of the preceding items, wherein the first filter is a fixed filter.

7. An audio device comprising a feedforward active noise cancellation system according to any of the preceding items.

8. An audio device according to item 7, wherein the audio device comprises a headset or a set of earbuds.

9. A method for feedforward active noise cancellation comprising:

obtaining an input audio signal indicative of ambient sounds, filtering a first input signal to provide a first filtered audio signal, wherein the first input signal is based on the input audio signal, wherein the filtering is based on a primary transfer and a secondary transfer function, wherein the primary transfer function is determined based on estimated characteristics of a first sound path a first propagation delay from one or more reference microphones to one or more error microphones, and wherein the secondary transfer function is determined based on estimated characteristics of a second sound path having a second propagation delay from one or more loudspeakers to the one or more error microphones, filtering a second input signal to provide a second filtered audio signal, wherein the second input signal is based on the first filtered audio signal, wherein filtering the second input signal comprises to predict speech to compensate for a processing delay and the second propagation delay exceeding the first propagation delay, wherein speech is predicted by a linear predictor of speech.

The invention claimed is:

1. A feedforward active noise cancellation system comprising:

one or more reference microphones for obtaining an input audio signal indicative of a first ambient sound, one or more loudspeakers for outputting a first anti-noise sound, one or more error microphones for obtaining an error signal indicative of a second anti-noise sound and a second ambient sound, wherein the second ambient sound corresponds to the first ambient sound having travelled a first sound path having a first propagation delay from the one or more reference microphones to the one or more error microphones, and wherein the second anti-noise sound corresponds to the first anti-noise sound having travelled along a second sound path having a second propagation delay from the one or more loudspeakers to the one or more error microphones, a first filter configured to receive a first input signal, filter the first input signal, and output a first filtered audio signal, wherein the first filter is configured to filter the first input signal to minimize a residual error determined based on the input audio signal and the error signal, a second and adaptive filter configured to receive a second input signal, filter the second input signal, and output a second filtered audio signal, wherein the second and adaptive filter comprises a linear predictor of speech, wherein the second and adaptive filter is configured to filter the second input signal based on predicted speech to compensate for a processing delay and the second propagation delay exceeding the first propagation delay.

2. A feedforward active noise cancellation system according to item 1, wherein the first filter is configured to filter the first input signal based on a primary transfer function and a secondary transfer function, wherein the primary transfer function is determined based on estimated characteristics of the first sound path, and wherein the secondary transfer function is determined based on estimated characteristics of the second sound path.

3. A feedforward active noise cancellation system according to item 2, wherein the first filter is configured to filter the first input signal based on a minimum phase part of the primary transfer function, and a minimum phase part of the secondary transfer function.

4. A feedforward active noise cancellation system according to claim 1, wherein the linear predictor of speech comprises a high-order sparse linear predictor.

5. A feedforward active noise cancellation system according to claim 1, wherein the second and adaptive filter is adapted based on an improved proportionate normalised least mean squares algorithm.

6. A feedforward active noise cancellation system according to claim 1, wherein the first filter is a fixed filter.

7. An audio device comprising a feedforward active noise cancellation system according to claim 1.

8. An audio device according to item 7, wherein the audio device comprises a headset or a set of earbuds.

9. A method for feedforward active noise cancellation comprising:

obtaining an input audio signal indicative of ambient sounds, filtering a first input signal to provide a first filtered audio signal, wherein the first input signal is based on the input audio signal, wherein the filtering is based on a primary transfer and a secondary transfer function, wherein the primary transfer function is determined based on estimated characteristics of a first sound path a first propagation delay from one or more reference microphones to one or more error microphones, and wherein the secondary transfer function is determined based on estimated characteristics of a second sound path having a second propagation delay from one or more loudspeakers to the one or more error microphones, filtering a second input signal to provide a second filtered audio signal, wherein the second input signal is based on the first filtered audio signal, wherein filtering the second input signal comprises to predict speech to compensate for a processing delay and the second propagation delay exceeding the first propagation delay, wherein speech is predicted by a linear predictor of speech.

* * * * *